(12) United States Patent
Mersh

(10) Patent No.: US 10,650,168 B2
(45) Date of Patent: May 12, 2020

(54) DATA PROCESSING DEVICE

(71) Applicant: Secure Thingz Limited, Cambridge, Cambridgeshire (GB)

(72) Inventor: John David Mersh, Cambridge (GB)

(73) Assignee: Secure Thingz Limited, Cambridge, Cambridgeshire (GB)

( * ) Notice: Subject to any disclaimer, the term of this patent is extended or adjusted under 35 U.S.C. 154(b) by 125 days.

(21) Appl. No.: 15/766,196

(22) PCT Filed: Oct. 10, 2016

(86) PCT No.: PCT/GB2016/053150
§ 371 (c)(1),
(2) Date: Apr. 5, 2018

(87) PCT Pub. No.: WO2017/060740
PCT Pub. Date: Apr. 13, 2017

(65) Prior Publication Data
US 2018/0285602 A1 Oct. 4, 2018

(30) Foreign Application Priority Data

Oct. 9, 2015 (GB) .................................. 1517896.5

(51) Int. Cl.
*G06F 21/00* (2013.01)
*G06F 21/74* (2013.01)
(Continued)

(52) U.S. Cl.
CPC .............. *G06F 21/74* (2013.01); *G06F 21/33* (2013.01); *G06F 21/72* (2013.01); *G06F 21/73* (2013.01);
(Continued)

(58) Field of Classification Search
CPC .......... G06F 21/33; G06F 21/74; G06F 21/72; G06F 21/78
(Continued)

(56) References Cited

U.S. PATENT DOCUMENTS 9,864,866 B2 * 1/2018 Pasion ................... G06F 21/10
2006/0005015 A1 1/2006 Durham et al.
(Continued)

FOREIGN PATENT DOCUMENTS

| GB | 2396930 A | 7/2004 |
|---|---|---|
| WO | 01/46800 A2 | 6/2001 |

(Continued)

OTHER PUBLICATIONS

International Search Report dated Feb. 2, 2017 for International Application No. PCT/GB2016/053150, entitled "Data Processing Device".

(Continued)

*Primary Examiner* — Anthony D Brown
(74) *Attorney, Agent, or Firm* — Hamilton, Brook, Smith & Reynolds, P.C.

(57) ABSTRACT

A data processing device with a processor, a memory and an access control mechanism, the device having secure and non-secure modes, the memory having secure and non-secure regions, the secure region containing cryptographic data, and the access control mechanism preventing the processor from reading the cryptographic data when the device is operating in the non-secure mode. Also, methods of manufacturing and authenticating such a device, manufacturing an item of electronic equipment that includes such a device, a computer program for storing data on such a device, secure data processing hardware including such a (Continued)

computer program and a method of updating data stored in an item of electronic equipment including such a data processing device.

17 Claims, 6 Drawing Sheets

(51) Int. Cl.
    *G06F 21/72*     (2013.01)
    *G06F 21/33*     (2013.01)
    *G06F 21/73*     (2013.01)
    *G06F 21/78*     (2013.01)
    *H04L 9/08*     (2006.01)
    *H04L 9/30*     (2006.01)
    *H04L 9/32*     (2006.01)

(52) U.S. Cl.
    CPC .............. *G06F 21/78* (2013.01); *H04L 9/088* (2013.01); *H04L 9/30* (2013.01); *H04L 9/3247* (2013.01); *G06F 2221/2107* (2013.01); *G06F 2221/2113* (2013.01); *G06F 2221/2149* (2013.01)

(58) Field of Classification Search
    USPC ......................................................... 713/193
    See application file for complete search history.

(56) References Cited

U.S. PATENT DOCUMENTS

2010/0017625 A1     1/2010     Johnson et al.
2015/0082053 A1     3/2015     Sano et al.

FOREIGN PATENT DOCUMENTS

WO     2004/046934 A2     6/2004
WO     2006/059335 A1     6/2006
WO     2017/060740 A1     4/2017

OTHER PUBLICATIONS

Written Opinion of the International Searching Authority dated Feb. 2, 2017 for International Application No. PCT/GB2016/053150, entitled "Data Processing Device".

International Property Office Search Report dated Feb. 25, 2016 for Application No. GB1517896.5.

* cited by examiner

DATA PROCESSING DEVICE

This application is the U.S. National Stage of International Application No. PCT/GB2016/053150, filed Oct. 10, 2016, which designates the U.S., published in English, and claims priority under 35 U.S.C. § 119 or 365(c) to Great Britain Application No. 1517896.5, filed Oct. 9, 2015. The entire teachings of the above applications are incorporated herein by reference.

FIELD OF THE INVENTION

This invention relates to a data processing device, to methods of manufacturing and authenticating such a device, and to a method of manufacturing an item of electronic equipment including such a device.

BACKGROUND TO THE INVENTION

It is common for an original equipment manufacturer (OEM) to use a contract manufacturer (CM) to manufacture items of electronic equipment that include a data processing device. The manufacturing process carried out by the CM typically includes populating printed circuit boards with electronic components including the data processing devices, and installing software on the data processing devices.

The software installed on the devices may contain valuable intellectual property. It would be useful for the CM to be able to install the software on the data processing devices but be unable to view the software.

A known problem with the use of CMs is so-called "grey manufacture", where a CM manufactures more of the items of electronic equipment than have been requested by the OEM, and sells the additional items of electronic equipment for a reduced price with no customer support. This reduces the profit made by the OEM, and can also damage the reputation of the OEM, as the "grey manufactured" items of electronic equipment are likely to be indistinguishable from the items of electronic equipment sold by the OEM.

It is known to use a hardware security module (HSM) to prevent or at least detect grey manufacture, particularly in the field of mobile 'phone manufacture, where it is important that an international mobile equipment identity (IMEI) of each mobile 'phone is unique. An HSM is a computer in a tamper-proof or tamper-evident case that uses encryption to maintain a store of available IMEIs and a record of which IMEIs have been issued for use in a mobile 'phone manufacturing process. An HSM is an extremely expensive piece of equipment, as well as being bulky to transport between an OEM and a CM.

It would be possible to use an HSM to install firmware on data processing devices in a manufacturing process carried out by a CM, so as to enable an OEM to detect any grey manufacture. For the reasons above, however, this would not be practical except for very large production runs.

Public-key or asymmetric cryptography involves generation of mathematically linked public and private keys that make up a key pair. The public key is made available to others by the owner of the key pair and can be used to encrypt plaintext to generate cipher text. Cipher text generated using the public key cannot be decrypted using the public key; it can only be decrypted using the private key, which is kept secret by the owner of the key pair. The private key can also be used to apply a digital signature to data. The public key can be used to verify the digital signature applied to data using the private key as having been applied by the owner of the key pair.

SUMMARY OF THE INVENTION

According to a first aspect of the invention, there is provided a data processing device comprising a processor and a memory, the processor being operable in secure and non-secure modes and the memory having secure and non-secure regions, the secure region of the memory being accessible by the processor only when the processor is operating in the secure mode, wherein the device is operable in the secure mode to decrypt encrypted data stored in the non-secure region of the memory using a decryption key stored in the secure region of the memory to generate decrypted data, and to store the decrypted data in the secure region of the memory.

According to a second aspect of the invention, there is provided a data processing device comprising a processor, a memory and an access control mechanism, the device being operable in secure and non-secure modes, the memory having secure and non-secure regions, the secure region containing cryptographic data, and the access control mechanism being operable to prevent the processor from reading the cryptographic data when the device is operating in the non-secure mode.

The cryptographic data may advantageously comprise a decryption key.

Alternatively, or in addition, the cryptographic data may advantageously comprise a seed, and the device be operable to carry out a key derivation algorithm to derive an asymmetric device encryption key (DEK) pair from the seed.

The access control mechanism may, for example, form part of the processor, and be operable to prevent the processor from reading the secure region of the memory when the device is operating in the non-secure mode.

The invention can provide a data processing device that can be programmed while operating in a non-secure mode with encrypted data, and can then decrypt the encrypted data once the device is operating in a secure mode.

This could be useful where an OEM requires a CM to program data processing devices, but does not wish the CM to have access to the unencrypted data. The CM does not need to be able to operate the device in the secure mode in order to program the device, because the encrypted data are stored in the non-secure region of the memory, which can be accessed by the processor when operating in the non-secure mode.

In order to decrypt the encrypted data, the processor must operate in the secure mode, because a decryption key, or seed used to derive a decryption key, necessary to decrypt the encrypted data is stored in the secure region of the memory, which is accessible by the processor only when it is operating in the secure mode. The CM is unable to operate the processor in the secure mode, so is unable to obtain the decryption key or seed or the decrypted data.

The processor and memory are preferably formed as a single integrated circuit. Where the processor and memory are so formed, it is more difficult to monitor signals between the processor and memory to try to retrieve the unencrypted data.

Alternatively, the processor and memory may advantageously be formed as separate integrated circuits, but in a single package. Where the processor and memory are so formed, it is less difficult, but still difficult to monitor signals between the processor and memory to try to retrieve the unencrypted data.

The device may advantageously include a decryption key stored in the secure region of the memory.

The decryption key may advantageously comprise a private key of an asymmetric device encryption key (DEK) pair.

The device may advantageously include a device identifier stored in the non-secure region of the memory.

It is envisaged, however, that the device identifier could instead, or in addition, be stored in the secure region of the memory.

Where the device includes the device identifier, the invention can further provide a secure data processing device that, in conjunction with a trusted certification authority (TCA), is capable of authentication as a device certified by the TCA.

The TCA would typically be the manufacturer of the secure data processing device, or a third party that has contracted with the manufacturer to act on behalf of the manufacturer as a TCA.

The device identifier could, for example, be a randomly generated number. What is important is that the device identifier should not be easy to guess. That is to say, given a device identifier for one device, it should not be easy to guess the device identifier of another device. The device identifier should therefore not be a serial number, for example.

A user of the device can authenticate the device as certified by the TCA by obtaining the device identifier from the device and sending the device identifier to the TCA. If the device identifier is the device identifier of a device certified by the TCA, the TCA will have generated a device certificate for the device by digitally signing the device identifier of the device using a private key of an asymmetric TCA encryption key pair. The TCA would then send the device certificate and a public key of the TCA key pair to the user of the device. The user of the device would then authenticate the device by verifying the digital signature of the device identifier using the public key of the TCA key pair and comparing it with the device identifier obtained from the device.

The device may advantageously include a device certificate stored in the non-secure region of the memory.

It is envisaged, however, that the device identifier could instead, or in addition, be stored in the secure region of the memory.

Where the device certificate is stored in the device, authentication of the device is simplified. A user of the device would then obtain the device identifier from the device and send the device identifier to the TCA. If the device identifier is the device identifier of a device certified by the TCA, the TCA will have generated a device certificate for the device as described above, and stored it in the device. The TCA would then send the public key of the TCA key pair to the user of the device, who would then authenticate the device by verifying the device certificate as described above.

It will be apparent that the device certificate can include other data, such as details of a semiconductor fabrication plant where the device was made, or a silicon designer responsible for designing the device. The details of the semiconductor fabrication plant or silicon designer may, for example, include public keys of asymmetric encryption key pairs of these entities, which may be used to sign the device certificate.

Where the decryption key is a private key of a DEK pair, the device identifier may advantageously comprise a public key of the DEK pair, because the public key has the required quality of being difficult to guess.

According to a third aspect of the invention, there is provided a method of manufacturing a data processing device according to the first aspect of the invention, the method comprising fabricating the device; generating a first asymmetric encryption key pair; generating a device identifier for the device; generating a device certificate for the device by digitally signing the device identifier using a private key of the first asymmetric encryption key pair; and storing the device identifier in the non-secure region of the memory of the device.

According to a fourth aspect of the invention, there is provided a method of manufacturing a data processing device according to the second aspect of the invention, the method comprising receiving a first asymmetric encryption key pair; receiving a device identifier for the device; generating a device certificate for the device by digitally signing the device identifier using a private key of the first asymmetric encryption key pair; and storing the device identifier in the memory of the device.

The device identifier is preferably stored in the non-secure region of the memory.

The method may advantageously further comprise storing the device certificate in the non-secure region of the memory of the device.

It is envisaged, however, that the device certificate could instead, or in addition, be stored in the secure region of the memory.

The method may advantageously further comprise generating or receiving a second asymmetric encryption key pair and storing a private key of the second key pair, or a seed from which the second asymmetric encryption key pair may be generated by the device using a key derivation algorithm, in the secure region of the memory of the device.

Where the method includes generating or receiving the second key pair, the device identifier may advantageously comprise the public key of the second key pair.

According to a fifth aspect of the invention, there is provided a method of authenticating a data processing device manufactured according to the method of the third aspect of the invention, the method comprising obtaining the device identifier from the device; sending the device identifier to a trusted certification authority (TCA); if the device identifier is valid, receiving from the TCA the public key of the first key pair; obtaining the device certificate; and authenticating the device by verifying the device certificate using the device identifier and the public key of the first key pair.

Where the device certificate is stored in the non-secure region of the memory, obtaining the device certificate preferably comprises obtaining the device certificate from the device.

According to a sixth aspect of the invention, there is provided a method of authenticating a data processing device manufactured according to the method of the fourth aspect of the invention, the method comprising obtaining the device identifier from the device; sending the device identifier to a trusted data store containing at least one device identifier; if the device identifier is recognised, obtaining the device certificate and a public key of the first asymmetric encryption key pair; and authenticating the device by verifying the device certificate using the device identifier and the public key of the first asymmetric encryption key pair.

According to a seventh aspect of the invention, there is provided a method of manufacturing an item of electronic equipment that includes a data processing device manufactured according to the method of the third aspect of the invention, the method comprising a first manufacturing party providing a second manufacturing party with secure data processing hardware containing data to be stored on the device and a value representative of a permitted number of devices on which the data is permitted to be stored; the second manufacturing party requesting permission from the hardware to store the data on the device; the hardware determining from the value representative of the permitted number of devices whether to permit the request and, if so, authenticating the device according to the method of the fifth aspect of the invention; if the authentication is successful, storing the data on the device; and adjusting the value representative of the permitted number of devices.

According to an eighth aspect of the invention, there is provided a method of manufacturing an item of electronic equipment that includes a data processing device manufactured according to the method of the fourth aspect of the invention, the method comprising receiving, by a second manufacturing party from a first manufacturing party, secure data processing hardware containing data to be stored on the device and a value representative of a permitted number of devices on which the data are permitted to be stored; the second manufacturing party requesting permission from the hardware to store the data on the device, thereby causing the hardware to determine from the value representative of the permitted number of devices whether to permit the request and, if so, authenticate the device according to the method of the sixth aspect of the invention; if the authentication is successful, storing the data on the device; and adjusting the value representative of the permitted number of devices.

The manufacturing method of the invention can make it very difficult for the second manufacturing party to manufacture any more items of electronic equipment than the permitted number of devices, because the secure data processing hardware will not permit the data contained in the hardware to be stored on a device after it has been stored on the permitted number of devices. Moreover, the step of authenticating each device before storing the data on the device means that it is very difficult for the second manufacturing party to obtain a copy of the data by connecting a fake device to the hardware. In any case, if the second manufacturing party were to do this, it would be detectable by the first manufacturing party, because the first manufacturing party would be provided with one item fewer than the permitted number of devices.

Where the method of manufacturing the device includes generating the second key pair and storing the private key of the second key pair in the secure region of the memory, the method may advantageously further comprise the hardware encrypting the data using the public key of the second key pair before storing the data on the device.

In this way the manufacturing method of the invention can make it even more difficult for the second manufacturing party to manufacture any more items of electronic equipment than the permitted number of devices, because even if the second manufacturing party were to intercept the data passing from the hardware to the device, the data would be encrypted and capable of decryption only by the particular device to which the data was being sent.

This approach has the disadvantage that asymmetric encryption of a large quantity of data requires a considerable amount of processing, which might slow down the manufacturing process or make necessary more expensive secure data processing hardware.

Preferably, therefore, where the method of manufacturing the device includes generating the second key pair and storing the private key of the second key pair in the secure region of the memory, the method further comprises providing the second manufacturing party with secure data processing hardware containing data to be stored on the device, which data are encrypted using a symmetric encryption key, and storing on the device the encrypted data, together with an encrypted version of the symmetric encryption key, the symmetric encryption key being encrypted using the public key of the second key pair.

In this way the data need be encrypted only once, but the data passed between the hardware and the device retain the characteristic of being capable of decryption only by the particular device to which the data are being sent. In addition, the task of the device in decrypting the data is greatly simplified, because the device need only carry out the more processing-intensive asymmetric decryption of the symmetric encryption key, and can then decrypt the data using the less processing-intensive symmetric decryption.

An increased level of security can be obtained by generating a new symmetric encryption key for each device on which the data are stored, encrypting the data with the new symmetric encryption key and encrypting the symmetric encryption key using the public key of the second key pair, then storing the encrypted data and encryption key on the device. This would have the cost of increasing the amount of processing required to be carried out by the hardware, which might slow down the manufacturing process.

In a preferred embodiment of the invention the secure data processing hardware comprises a programmed computer and a Java® card or secure element or hardware security module (HSM), the Java® card or secure element or (HSM) containing the data and the value representative of the permitted number of devices, and the programmed computer being operable to receive the requests from the second manufacturing party, pass the requests to the Java® card or secure element, obtain the device identifier from the device, and send the data to the device.

The use of a programmed computer and Java® card or secure element is particularly advantageous because the second manufacturing party can use its own computer and install software provided by the first manufacturing party in order to program the computer, and the Java® card or secure element is small and inexpensive enough to be sent through the mail. The programmed computer can store on the Java® card or secure element a list of the devices on which the data have been stored, and the first manufacturing party can require the second manufacturing party to return the Java® card or secure element for inspection at the end of the production run.

According to a ninth aspect of the invention, there is provided a computer program for executing on secure computer hardware a computer process for storing data on a data processing device according to the second aspect of the invention, the process comprising the steps of receiving a request to store the data on the data processing device; determining from a value representative of a permitted number of devices on which the data are permitted to be stored whether to permit the request; if so, obtaining from the data processing device a device identifier stored on the data processing device; sending the device identifier to a trusted data store containing at least one device identifier; if the device identifier is recognised, receiving from the trusted data store a public key of a first asymmetric key pair; obtaining a device certificate for the data processing device, the device certificate having been generated by digitally signing the device identifier using a private key of the first asymmetric encryption key pair; authenticating the device by verifying the device certificate using the device identifier and the public key of the first key pair; if the authentication is successful, storing the data on the second device; and adjusting the value representative of the permitted number of devices.

According to a tenth aspect of the invention, there is provided secure computer hardware including a hardware security module (HSM) containing a computer program according to the eighth aspect of the invention, data for storage on a second data processing device, and a value representative of a permitted number of data processing devices on which the data are permitted to be stored.

According to an eleventh aspect of the invention, there is provided a method of updating data stored in an item of electronic equipment including a data processing device according to the second aspect of the invention, the cryptographic data comprising a private key of an asymmetric device encryption key (DEK) pair or a seed, and the device being operable to carry out a key derivation algorithm to derive an asymmetric device encryption key (DEK) pair from the seed, the method comprising storing in the device update data and an encrypted version of the device identifier, the device identifier having been encrypted using the public key of the DEK pair; placing the device in the secure mode, decrypting the encrypted version of the device identifier using the private key of the DEK pair, comparing the decrypted encrypted version of the device identifier with the device identifier stored in the memory of the device; and, if the device identifiers match, updating data stored in the item of electronic equipment using the update data.

BRIEF DESCRIPTION OF THE DRAWINGS

The invention will now be described, by way of example, with reference to the attached drawing figures, in which.

DETAILED DESCRIPTION OF EMBODIMENTS

Figure 1:
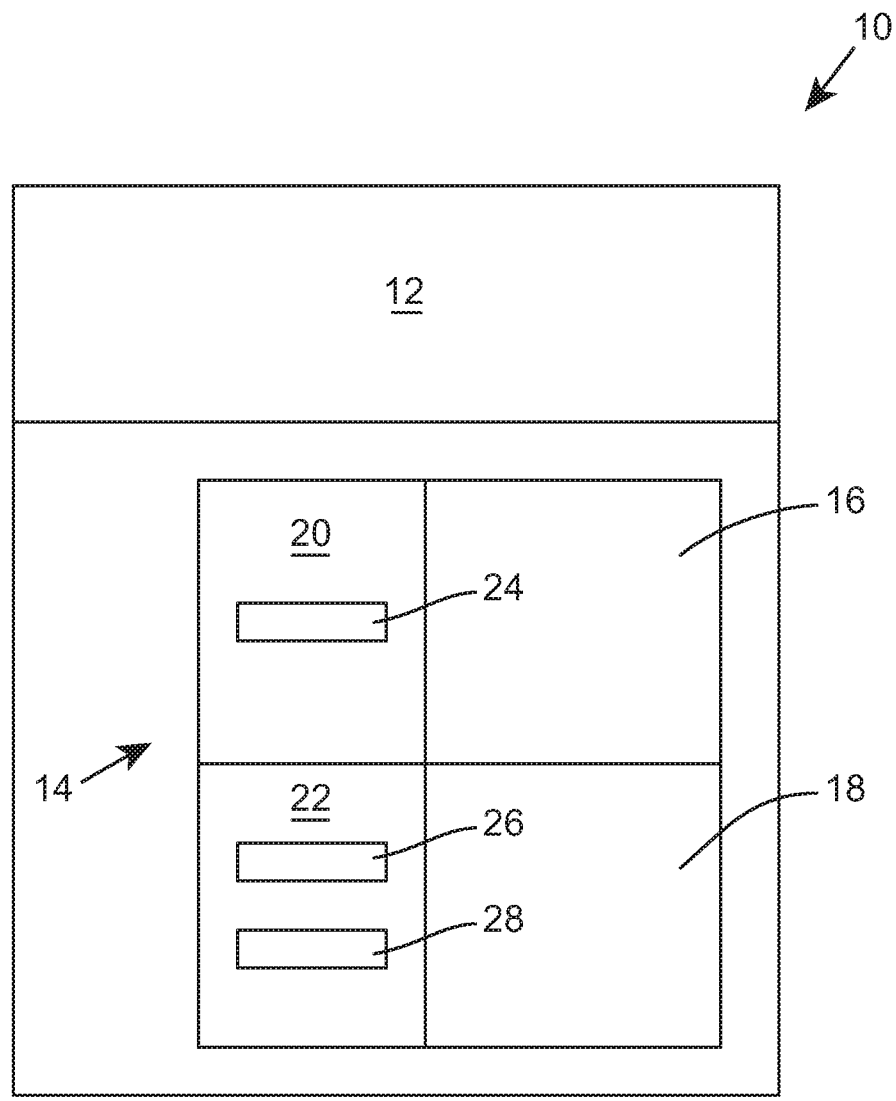
FIG. 1 is a schematic representation of a data processing device in accordance with the first aspect of the invention.

The data processing device 10 of FIG. 1 comprises a processor 12 and a memory 14 formed as a single integrated circuit. The device 10 includes various other components, such as input and output circuits, which are not shown as these are not relevant to the invention and are well understood by those skilled in the art. The memory 14 has secure and non-secure regions 16 and 18, respectively. The processor 12 has secure and non-secure operating modes, the processor operating in the non-secure mode by default but being operable in the secure mode following completion of a security process, such as causing execution of a mode switch instruction stored at an address in the secure memory that would be known only to those required to operate the processor in the secure mode. The processor 12 is able to access the secure region 16 of the memory only when operating in the secure mode.

The processor 12 includes an access control mechanism that prevents the processor 12 from reading the secure region 16 of the memory 14 when the processor is operating in the non-secure mode.

It will be understood by those skilled in the art that many processes exist for causing a processor to switch from a non-secure mode to a secure mode, and that the above example is just one of many possible approaches. For example, it might be possible for the processor to switch automatically from the non-secure mode to the secure mode in response to the value of a program counter changing from an address within the non-secure region of the memory to an address within the secure region of the memory. In this example, the processor would be able to execute data in the form of instructions stored in the secure region of the memory, but would be unable to read data from the secure region of the memory. Thus a user of the processor would be able to cause the processor to execute instructions stored in the secure region of the memory, but would be unable to cause the processor to output those instructions, so would be unable easily to access the data stored in the secure region of the memory.

The secure region 16 of the memory includes a non-volatile portion 20, in which is stored a private key 24 of an asymmetric device encryption key pair unique to the device. The non-secure region 18 of the memory includes a non-volatile portion 22, in which is stored a public key 26 of the device key pair, as well as a device certificate 28. The public key 26 functions as a device identifier for the device 10.

The device certificate is created by the manufacturer of the device by digitally signing the public key 26 of the device key pair using a private key of an asymmetric manufacturer encryption key pair. The manufacturer stores the private key 24, public key 26 and device certificate 28 in the memory 14 at the time of manufacture of the device 10. The private and public keys and device certificate could, however, be stored in the memory long after fabrication of the device, and by a trusted certification authority contracted by the manufacturer, rather than the manufacturer itself.

It is preferred, but not essential, that the device certificate be stored on the device. Where the device certificate is not stored on the device, it is envisaged that the device could, for example, when first powered up, create its own asymmetric device encryption key pair, and store the private and public keys in the secure and non-secure regions, respectively, of the memory.

Figure 2:
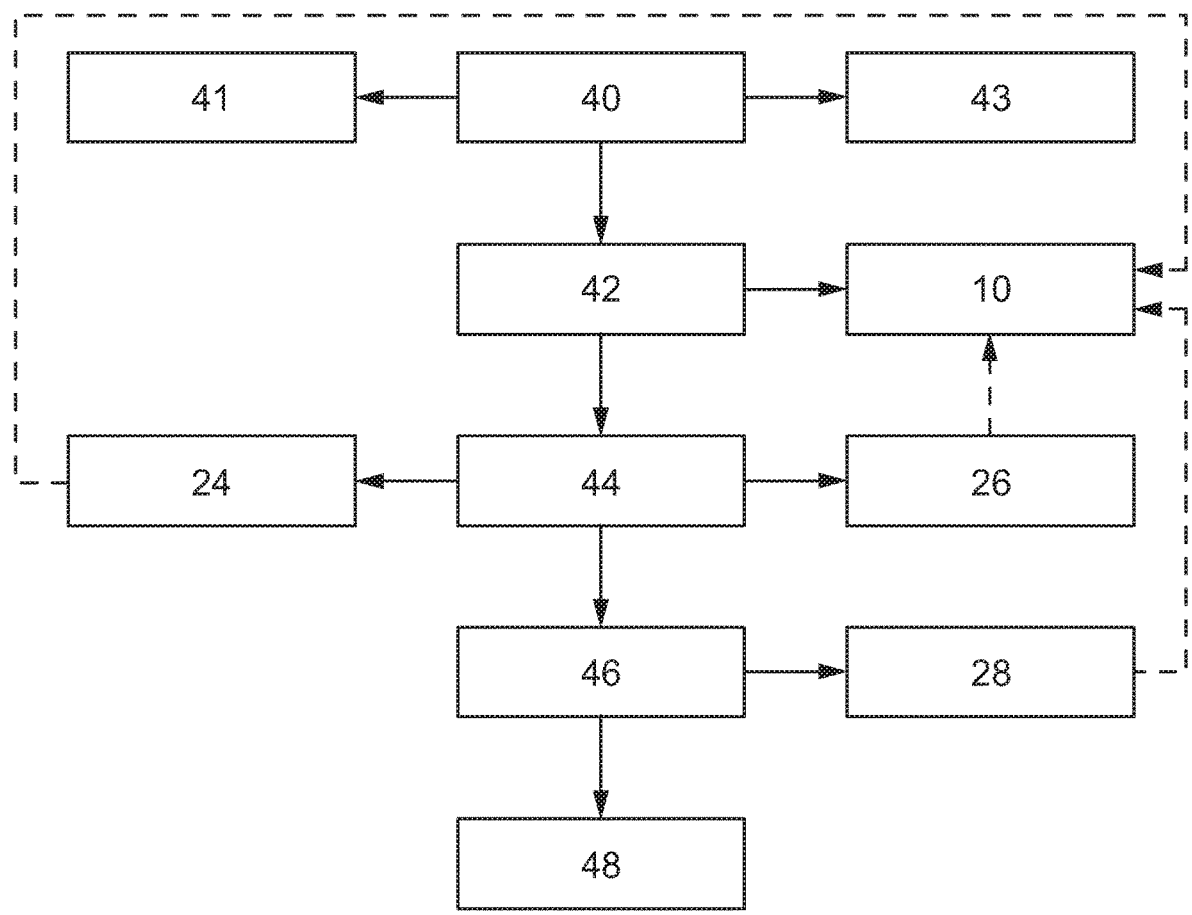
FIG. 2 is a flow chart of a method in accordance with the second aspect of the invention of manufacturing the data processing device of FIG. 1.

FIG. 2 shows a process for manufacturing the device 10. At a first step 40, the manufacturer generates a first asymmetric encryption key pair in the form of the asymmetric manufacturer encryption key pair made up of a manufacturer private key 41 and a manufacturer public key 43. The manufacturer private key 41 is a 256-bit binary word and the manufacturer public key 43 is made up of two 256-bit binary words.

At a second step 42, the manufacturer fabricates the device 10. It will be appreciated that steps 42 onwards would be repeated each time a device is manufactured, but the step 40 of generating the manufacturer keys 41 and 43 need be carried out only once for a production run of many devices.

At a third step 44, the manufacturer generates a second asymmetric encryption key pair in the form of the asymmetric device encryption key pair made up of the device private key 24 and device public key 26. The device keys 24 and 26 have the same formats as the manufacturer keys 41 and 43.

At a fourth step 46, the manufacturer generates the device certificate 28 by digitally signing, using the elliptic curve digital signature algorithm, the device public key 26 using the manufacturer private key 41.

At the fifth step 48, the manufacturer stores the device private key 24 in the secure region of the memory 14 of the device and stores the device public key 26 and device certificate 28 in the non-secure region of the memory 14, as shown by the dotted lines in FIG. 2.

Figure 3A:
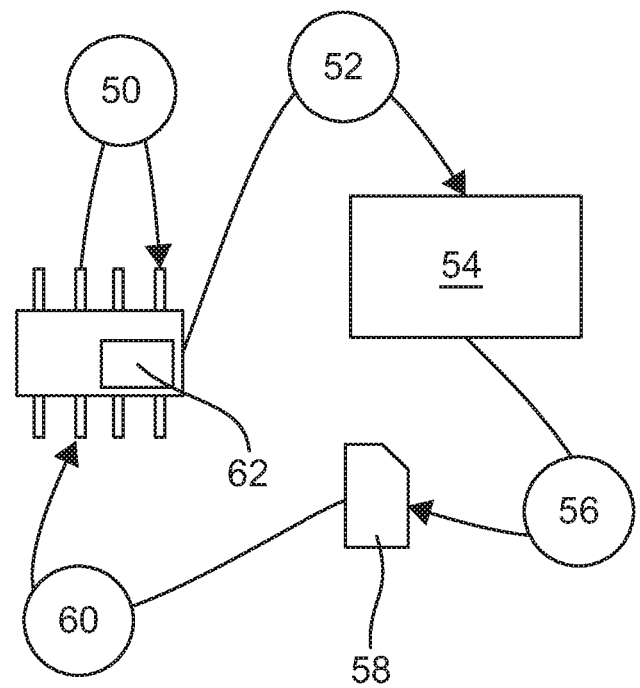
FIGS. 3a and 3b are schematic representations of the method of FIG. 2.
Figure 3B:
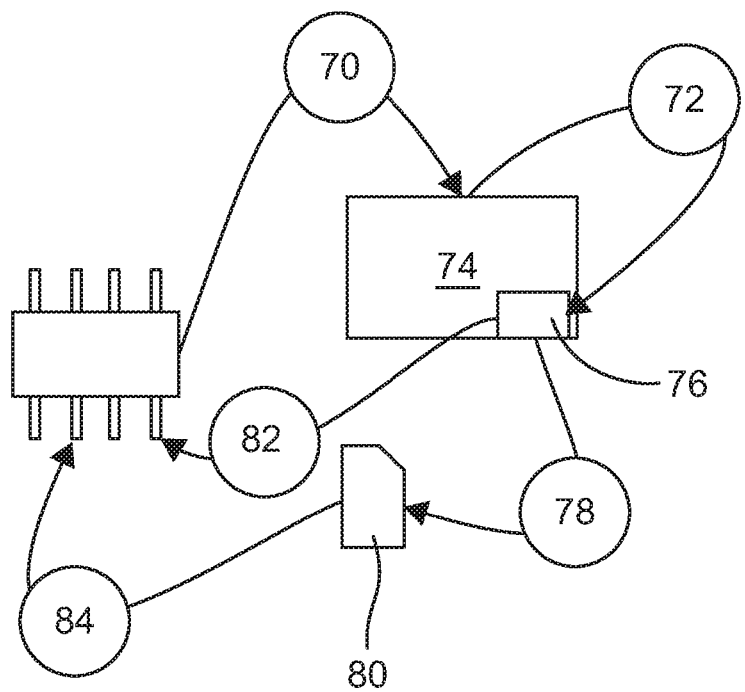

FIG. 3a shows schematically an alternative embodiment of parts of the device manufacturing method. At a first step 50 an asymmetric device encryption key 62 is generated and stored on the device. At a second step 52 a device public key is sent to a secure signature system 54, which may be under the control of the manufacturer or a trusted certification authority that acts on behalf of the manufacturer. At a third step 56 a device certificate 58 is generated by digitally signing the device public key using a private key of an asymmetric manufacturer encryption key pair. At a fourth, optional, step 60 the device certificate is stored on the device. FIG. 3b shows schematically another alternative embodiment of parts of the device manufacturing method. At a first step 70 a device identifier stored on the device, which device identifier is not a device public key, is read from the device and sent to a secure signature system 74. At a second step 72 an asymmetric device encryption key 76 is generated and stored on the device at a third step 82. At a fourth step 78 a device certificate 80 is generated by digitally signing the device public key using a private key of an asymmetric manufacturer key pair. At a fifth, optional, step 84, the device certificate is stored on the device.

Figure 4:
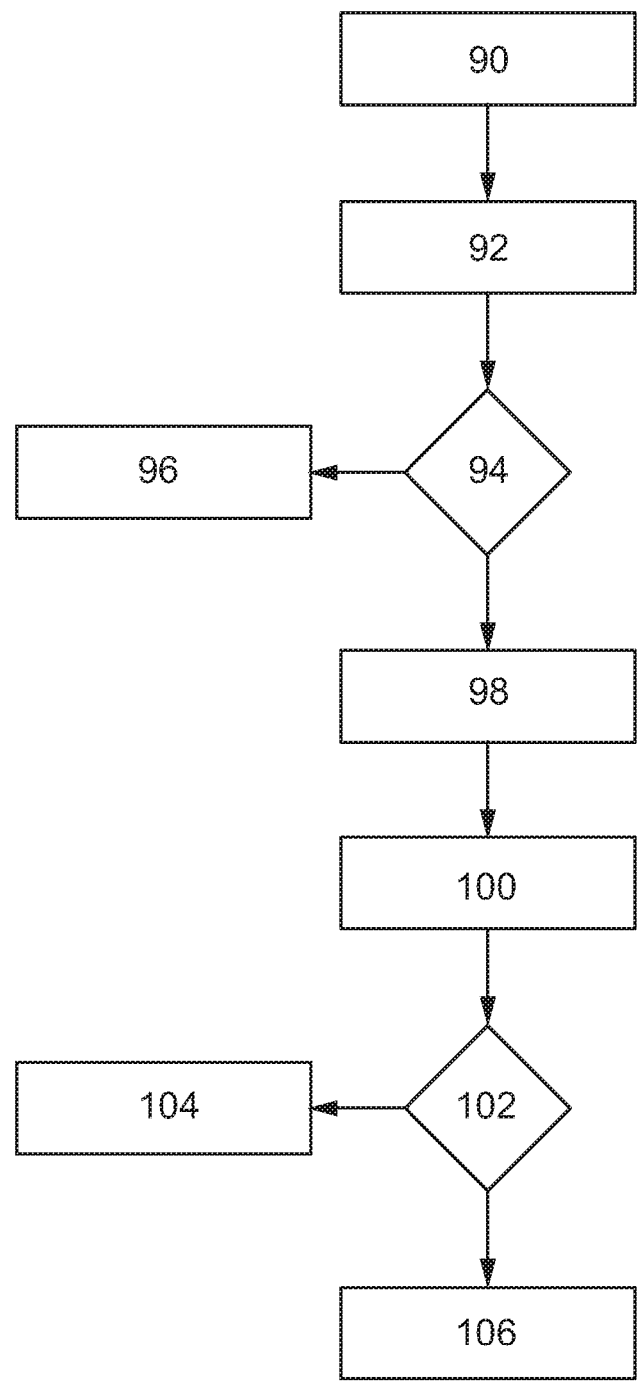
FIG. 4 is a flow chart of a method in accordance with the third aspect of the invention of authenticating the data processing device of FIG. 1.

FIG. 4 shows a process for authenticating the device as having been certified by the manufacturer. At a first step 90 a user obtains a device identifier, which may be a public key of a device key pair, from the device. Step 90 would typically be carried out by a programmed computer connected to a device programmer, the device being connected to the device programmer (not shown in FIG. 4). In response to a request entered into the computer by the user, the computer would cause the device programmer to obtain the device identifier from the non-secure region of the memory of the device. At a second step 92, the device identifier is sent to a trusted certification authority (TCA), which could be the manufacturer of the device. Step 92 would typically be carried out by the computer using an Internet connection to a server under the control of the TCA. At a third step 94, the device identifier is validated by the TCA. If the device identifier does not correspond to a device certified by the TCA, the authentication process ends at step 96. If the device identifier does correspond to a device certified by the TCA, the process moves to a fourth step 98, at which the TCA sends a public key of a first key pair in the form of an asymmetric manufacturer encryption key pair to the user. Third step 94 would typically be carried out by the server under the control of the TCA and fourth step 98 would typically be carried out by the server under the control of the TCA sending the public key to the computer using the Internet connection.

At a fifth step 100 the user obtains a device certificate for the device. As explained above, the device certificate is generated by digitally signing the device identifier using a private key of the manufacturer key pair. The device certificate would typically be stored on the device, in which case step 100 would be carried out by the computer causing the device programmer to obtain the device certificate from the non-secure region of the memory of the device. It is also envisaged, however, that the device certificate could be stored by the TCA, in which case step 100 would be carried out by the server under the control of the TCA using the device identifier to identify the stored device certificate for the device, and sending the device certificate to the computer using the Internet connection.

At a sixth step 102 the device certificate is verified using the elliptic curve digital signature algorithm. This involves computing a hash of the device identifier to produce a digest of the device identifier, decrypting the signature of the device certificate using the public key of the manufacturer key pair, and comparing the digest of the device identifier with the decrypted device certificate; if these match then at a seventh step 106 the device is authenticated as a device certified by the TCA. If the digest of the device identifier and the decrypted device certificate do not match, the authentication process ends at step 104.

The ability to carry out the above authentication process for a device is useful because the user then knows that if sensitive data are stored on the device, the device will not do anything unexpected with those data. For example, the user then knows that the device is not an imitation that lacks security features that would be present in a genuine device, or, worse, an imitation intended to provide access to data stored in the secure region of the memory.

Figure 5:
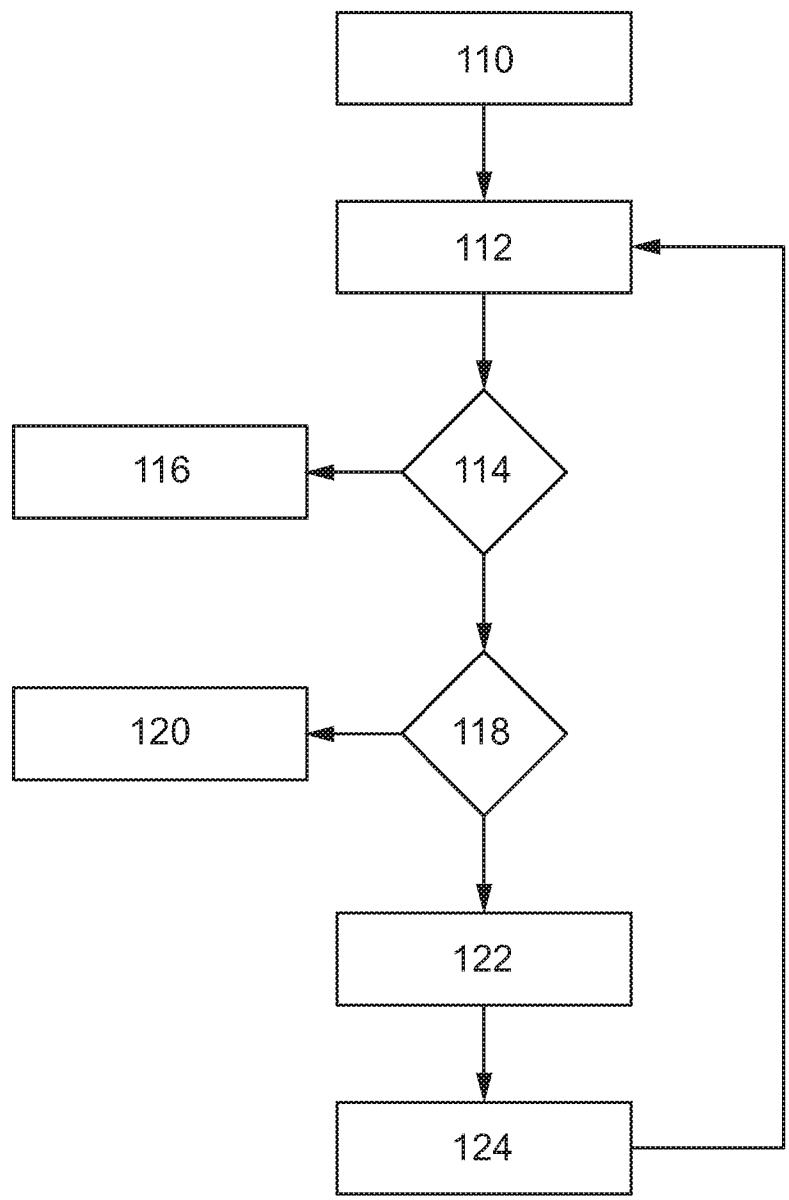
FIG. 5 is a flow chart of a method in accordance with the fourth aspect of the invention of manufacturing an item of electronic equipment including the data processing device of FIG. 1.

FIG. 5 shows a process for manufacturing an item of electronic equipment that includes the device. At a first step 110 a first manufacturing party in the form of an original equipment manufacturer (OEM) provides a second manufacturing party in the form of a contract manufacturer (CM) with secure data processing hardware in the form of software for installation on a manufacturing server of the CM and a Java® card or secure element (referred to hereafter as a "smart card"). The software includes data for storage on the device, the data having been encrypted using a symmetric encryption key using the advanced encryption standard (AES). The smart card includes a secure microprocessor and memory, similar to those used in credit and bank cards. The memory of the smart card contains the public key of the TCA key pair, together with the symmetric encryption key used to encrypt the data and a value of a number of devices on which the data may be stored.

For large production runs, or where a smart card may operate too slowly to meet the requirements of a manufacturing process, the cost of providing a hardware security module (HSM) to the CM may be justified. In that case, the first step 110 would comprise a first manufacturing party in the form of a third party contracted by the OEM providing the CM with secure data processing hardware in the form of an industrial computer including an HSM to run the software in a secure execution environment, the industrial computer including encrypted drives to store data such as the public key of the TCA key pair and the value of the number of devices on which the data may be stored. The encrypted drives may also contain an audit log containing details of the devices, such as device identifiers, on which the software has been stored.

It will be apparent that, instead of providing the secure data processing hardware to the CM, the CM could instead be provided with login details to enable the CM to obtain access to the secure data processing hardware via an Internet connection.

At a second step 112 the CM requests permission from the software installed on the manufacturing server to store the encrypted data on the device. The software causes the manufacturing server to forward the request via a smart card reader to the smart card. At a third step 114 the smart card determines whether the value of the number of devices on which the data may be stored is greater than zero. If not, the process ends at step 116. If the value is greater than zero, the process proceeds to a fourth step 118, at which the device on which the data are to be stored is authenticated.

At the authentication step 118 the smart card requests the device certificate and device identifier from the manufacturing server, which forwards the request to a device programmer connected to the device. The device certificate and device identifier are obtained from the non-secure region of the memory of the device by the device programmer and returned by the device programmer to the manufacturing server, which forwards the device certificate and device identifier to the smart card.

The smart card verifies the device certificate using the device identifier and the public key of the TCA key pair to authenticate the device. If the authentication fails, the process ends at step 120. If the authentication is successful, the process moves to a fifth step 122 at which the smart card encrypts using the elliptic curve integrated encryption standard the symmetric encryption key stored in the memory of the smart card using the public key of the device key pair (the public key of the device key pair is used as the device identifier, so is stored in the memory of the smart card from the fourth step 118). The smart card then passes the encrypted symmetric encryption key to the manufacturing server and instructs the manufacturing server to store the encrypted data and the encrypted symmetric encryption key in the non-secure region of the memory of the device. The manufacturing server sends the encrypted data and encrypted symmetric encryption key to the device programmer, which stores them in the device.

At a sixth step 124 the smart card decrements the value of the number of devices on which the data may be stored by one and the process returns to step 112 to await a further request to for permission to store the encrypted data on the device.

It will be seen that the invention can make grey manufacture extremely difficult for a CM, because the CM only has access to encrypted data, and can only access the encrypted data if it has an authenticated device on which to store the data. The smart card controls on how many devices the data may be stored, so even if the CM were able to obtain a supply of authenticated devices for the purposes of grey manufacture, leaving aside the issue of the data being encrypted, the CM would not be able to store the data on those devices without detection, because storing the data on those devices would mean a corresponding shortfall in the number of legitimate devices delivered to the OEM.

Once the encrypted data and encrypted symmetric encryption key are stored on the device, the device enters the secure mode and uses the private key of the device key pair to decrypt the encrypted symmetric encryption key using the elliptic curve integrated encryption standard. The device can then decrypt the encrypted data using the decrypted symmetric encryption key and store the decrypted data in the secure region of the memory. It is envisaged that in some circumstances, the device would store the decrypted data in the non-secure region of the memory, instead of the secure region, for example when updating firmware of the device.

While the manufacturing process above has been described in relation to software installed on a manufacturing server and a smart card, it is envisaged that the tasks performed by the manufacturing server could instead be performed by a simple computer provided by the OEM, provided that the computer includes a secure processor and memory, such as those of a smart card, for storing the symmetric encryption key, value of the number of devices and public key of the TCA key pair. Such a computer would still be very much less expensive than known HSMs.

Figure 6:
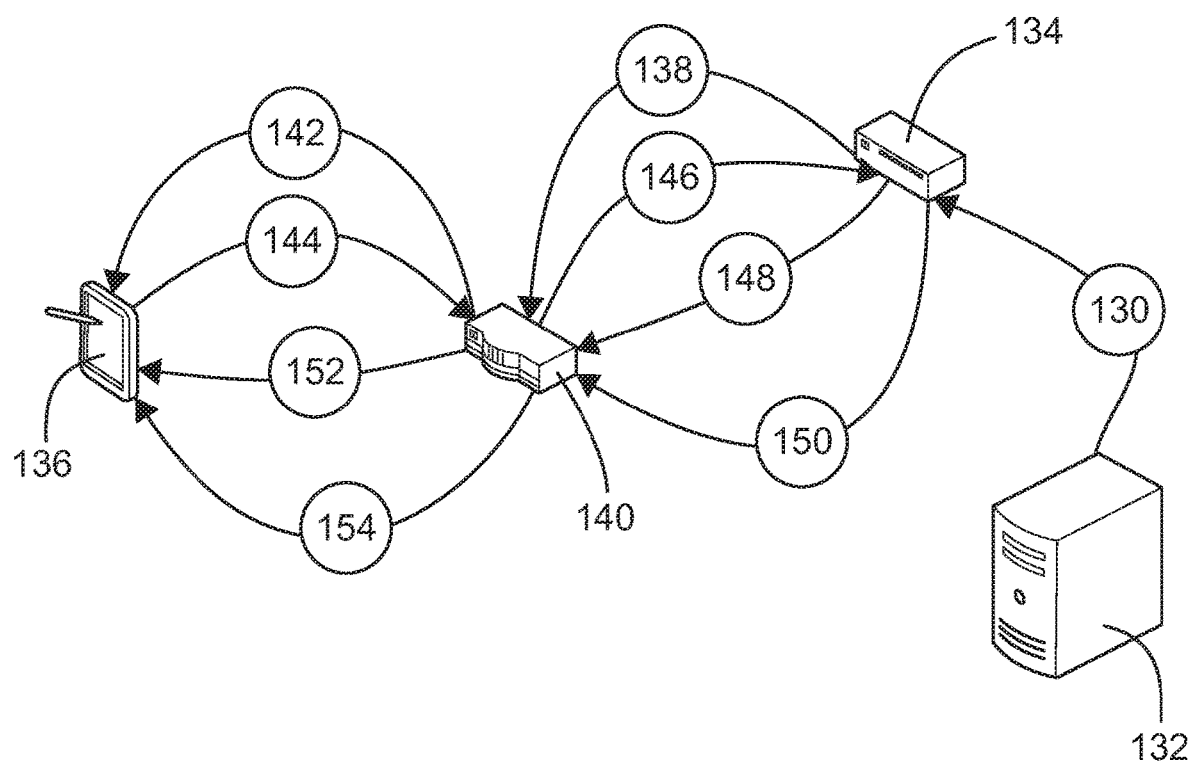
FIG. 6 is a schematic representation of the method of FIG. 5.

FIG. 6 shows schematically an alternative embodiment of parts of the electronic equipment manufacturing method. At a first step 130 a manufacturing server 132 under the control of a CM requests permission to store encrypted data stored in a secure computer 134 provided by the OEM in a data processing device that forms part of an item of electronic equipment 136. At a second step 138, which assumes that the value of the number of devices has been found not to be zero, the secure computer requests a device programmer 140 connected to the device of the item of electronic equipment 136 to obtain the device certificate and device identifier from the device. At a third step 142 the device programmer 140 requests the device certificate and device identifier from the device, which the device provides to the device programmer at a fourth step 144. At a fifth step 146 the device programmer provides the device certificate and device identifier to the secure computer 134.

The secure computer verifies the device certificate using the device identifier and public key of the TCA to authenticate the device and, at sixth and seventh steps 148 and 150, encrypts the symmetric encryption key using the public key of the device key pair (the device identifier) and provides the encrypted encryption key and encrypted data to the device programmer 140. At eighth and ninth steps 152 and 154, the device programmer stores the encrypted encryption key and encrypted data in the non-secure region of the memory of the device of the item of electronic equipment 136.

The computer program of the invention carries out various steps of the methods shown in FIGS. 5 and 6.

It will be apparent that, while the methods of manufacturing an item of electronic equipment described above are concerned with installing software on new items of electronic equipment, very similar considerations apply when updating software on such items of electronic equipment. That is to say, the same techniques described above that are used to ensure that a device onto which a CM wishes to install software is an authentic device, and a device on which the OEM has given permission to install the software, can be used to ensure that a software update sent to a device is an authentic software update and is intended for the device that has received the update.

It will be apparent that the above description relates only to a few example embodiments of the invention, and that the invention encompasses other embodiments as defined by the claims set out hereafter.

The invention claimed is:

1. A method of manufacturing an item of electronic equipment that includes a data processing device, the data processing device comprising a processor, a memory storing a device identifier and an access control mechanism, the data processing device being operable in secure and non-secure modes, the memory having secure and non-secure regions, the secure region containing cryptographic data, and the access control mechanism being operable to prevent the processor from reading the cryptographic data when the data processing device is operating in the non-secure mode, the method of manufacturing the item of electronic equipment comprising:

receiving, by a second manufacturing party from a first manufacturing party, secure data processing hardware containing data to be stored on the data processing device and a value representative of a permitted number of devices on which the data are permitted to be stored, or means for obtaining access to the secure data processing hardware;

the second manufacturing party requesting permission from the secure data processing hardware to store the data on the data processing device, thereby causing the secure data processing hardware to determine from the value representative of the permitted number of devices whether to permit the request and, if so, authenticate the data processing device by obtaining the device identifier from the data processing device; sending the device identifier to a trusted data store containing at least one device identifier; if the device identifier is recognized, obtaining the device certificate and a public key of the first asymmetric encryption key pair; and authenticating the data processing device by verifying the device certificate using the device identifier and the public key of the first asymmetric encryption key pair;

if the authentication is successful, storing the data on the data processing device, and adjusting the value representative of the permitted number of devices.

2. A method according to claim 1, wherein the data processing device is manufactured by receiving a first asymmetric encryption key pair; receiving the device identifier for the data processing device; generating a device certificate for the data processing device by digitally signing the device identifier using a private key of the first asymmetric encryption key pair; and storing the device identifier in the memory of the data processing device.

3. A method according to claim 2, wherein the data processing device is further manufactured by receiving a second asymmetric encryption key pair, wherein generating the device certificate further comprises digitally signing a public key of the second asymmetric encryption key pair using the private key of the first asymmetric encryption key pair.

4. A method according to claim 3, wherein the device identifier is stored in the non-secure region of the memory.

5. A method according to claim 2, wherein the data processing device is further manufactured by storing the device certificate in the non-secure region of the memory of the data processing device.

6. A method according to claim 2, wherein the data processing device is further manufactured by generating or receiving a second asymmetric encryption key pair and storing a private key of the second asymmetric encryption key pair, or a seed from which the second asymmetric encryption key pair may be generated by the data processing device using a key derivation algorithm, in the secure region of the memory of the data processing device.

7. A method according to claim 6, wherein the device identifier comprises the public key of the second asymmetric encryption key pair.

8. A method according to claim 6, the method of manufacturing the item of electronic equipment further comprising the hardware encrypting the data using a public key of the second asymmetric encryption key pair before storing the data on the data processing device.

9. A method according to claim 6, wherein the data to be stored on the data processing device are encrypted using a symmetric encryption key, and the method of manufacturing the item of electronic equipment further comprising storing on the data processing device the encrypted data, together with an encrypted version of the symmetric encryption key, the symmetric encryption key being encrypted using the public key of the second asymmetric encryption key pair.

10. A method according to claim 6, wherein the data to be stored on the data processing device are encrypted using a symmetric encryption key, and further comprising storing on the data processing device the encrypted data, together with an encrypted version of the symmetric encryption key, the symmetric encryption key being encrypted using the private key of the first asymmetric encryption key pair and the public key of the second asymmetric encryption key pair, for decryption using the public key of the first asymmetric encryption key pair and the private key of the second asymmetric encryption key pair.

11. A method according to claim 1, wherein the device certificate includes a public key of a second asymmetric encryption key pair, which public key has been digitally signed using the private key of the first asymmetric encryption key pair, said authentication of the data processing device further comprising obtaining the public key of the first asymmetric encryption key pair and using the public key of the first asymmetric encryption key pair to validate the device certificate.

12. Non-transitory computer readable storage medium storing processor control code that causes a processor to store data on a data processing device, the data processing device comprising a processor, a memory and an access control mechanism, the data processing device being operable in secure and non-secure modes, the memory having secure and non-secure regions, the secure region containing cryptographic data, and the access control mechanism being operable to prevent the processor of the data processing device from reading the cryptographic data when the data processing device is operating in the non-secure mode, comprising:

the processor control code causing the processor to store data on the data processing device by:

executing a request to store the data on the data processing device;

determining from a value representative of a permitted number of devices on which the data are permitted to be stored whether to permit the request; if so, obtaining from the data processing device a device identifier stored on the data processing device;

sending the device identifier to a trusted data store containing at least one device identifier;

if the device identifier is recognized, receiving from the trusted data store a public key of a first asymmetric key pair;

obtaining a device certificate for the data processing device, the device certificate having been generated by digitally signing the device identifier using a private key of the first asymmetric encryption key pair;

authenticating the data processing device by verifying the device certificate using the device identifier and the public key of the first asymmetric encryption key pair;

if the authentication is successful, storing the data on the data processing device; and adjusting the value representative of the permitted number of devices.

13. Secure data processing hardware including a cryptographic mechanism operable to restrict access to data stored in the secure data processing hardware comprising:

a data processing device comprising a processor, a memory and an access control mechanism, the device being operable in secure and non-secure modes, the memory having secure and non-secure regions, the secure region containing cryptographic data, and the access control mechanism being operable to prevent the processor of the data processing device from reading the cryptographic data when the data processing device is operating in the non-secure mode; and the processor executing computer program code stored on a non-transitory computer readable storage medium, the computer program code enabling data to be stored on the data processing device by:

processing a request to store the data on the data processing device;

determining from a value representative of a permitted number of devices on which the data are permitted to be stored whether to permit the request if so, obtaining from the data processing device a device identifier stored on the data processing device;

sending the device identifier to a trusted data store containing at least one device identifier;

if the device identifier is recognized, receiving from the trusted data store a public key of a first asymmetric key pair;

obtaining a device certificate for the data processing device, the device certificate having been generated by digitally signing the device identifier using a private key of the first asymmetric encryption key pair;

authenticating the data processing device by verifying the device certificate using the device identifier and the public key of the first asymmetric encryption key pair;

if the authentication is successful, storing the data on the data processing device; and adjusting the value representative of the permitted number of devices.

14. Secure data processing hardware according to claim 13, wherein the cryptographic mechanism comprises a Java® card, a secure element or a hardware security module.

15. A method of updating data stored in an item of electronic equipment including a data processing device, the data processing device comprising a processor, a memory storing a device identifier and an access control mechanism, the device being operable in secure and non-secure modes, the memory having secure and non-secure regions, the secure region containing cryptographic data, and the access control mechanism being operable to prevent the processor from reading the cryptographic data when the data processing device is operating in the non-secure mode, wherein the cryptographic data comprises (i) a decryption key comprising a private key of an asymmetric device encryption key (DEK) pair; or (ii) a seed, and the data processing device is operable to carry out a key derivation algorithm to derive an asymmetric device encryption key (DEK) pair from the seed, the method of updating data stored in the item of electronic equipment comprising:

storing in the data processing device update data and an encrypted version of the device identifier, the device identifier having been encrypted using the public key of the DEK pair;

placing the data processing device in the secure mode;

decrypting the encrypted version of the device identifier using the private key of the DEK pair;

comparing the decrypted encrypted version of the device identifier with the device identifier stored in the memory of the data processing device; and if the device identifiers match, updating data stored in the item of electronic equipment using the update data.

16. A method according to claim 15, wherein storing update data in the data processing device comprises storing encrypted update data and the method further comprises storing in the data processing device an encrypted version of decryption data necessary to decrypt the encrypted update data, the decryption data having been encrypted using the public key of the DEK pair; and, if the device identifiers match, decrypting the decryption data using the private key of the DEK pair, using the decrypted decryption data to decrypt the encrypted update data, and updating the data stored in the item of electronic equipment using the decrypted update data.

17. A method according to claim 16, wherein the encrypted version of the decryption data have been encrypted using the public key of the DEK pair and a private key of an update provider asymmetric encryption key pair, and the method further comprises storing in the data processing device a public key of the update provider asymmetric encryption key pair, and decrypting the decryption data using the private key of the DEK pair and the public key of the update provided asymmetric encryption key pair.

* * * * *